Sept. 1, 1931. W. A. MILES 1,821,270
APPARATUS FOR MOLDING IN SAND
Filed April 25, 1929 6 Sheets-Sheet 2
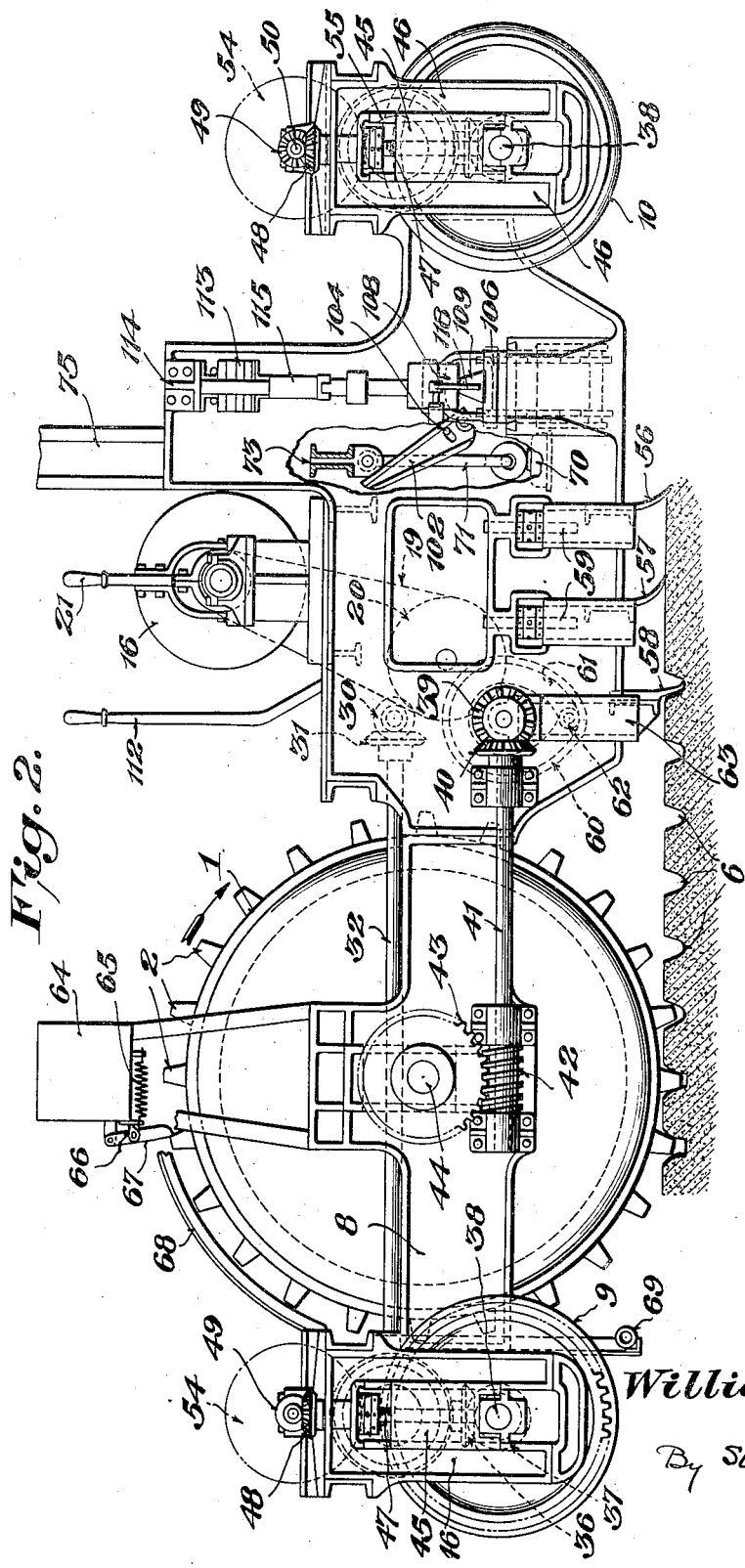
Fig. 2.
Inventor
William A. Miles,
Attorneys Sept. 1, 1931.  W. A. MILES  1,821,270
APPARATUS FOR MOLDING IN SAND
Filed April 25, 1929   6 Sheets-Sheet 6
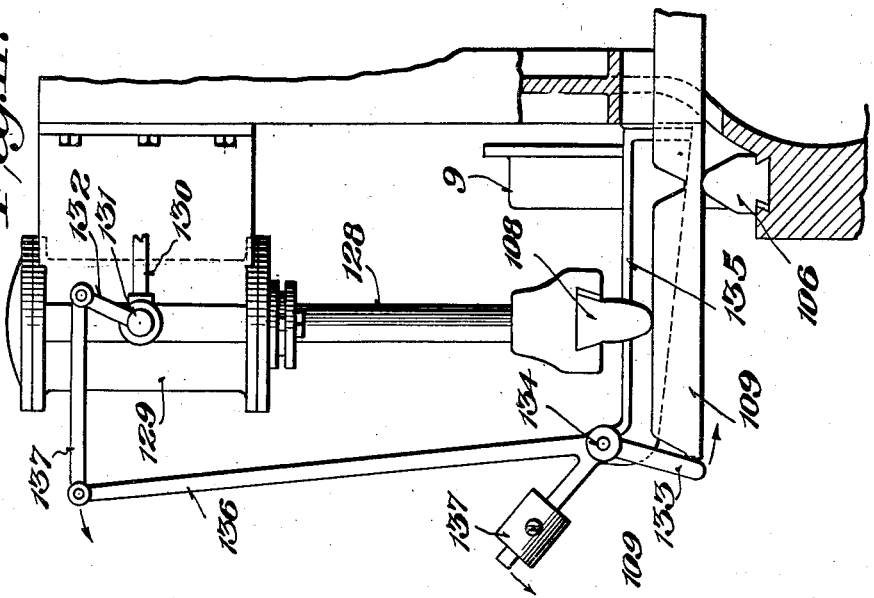
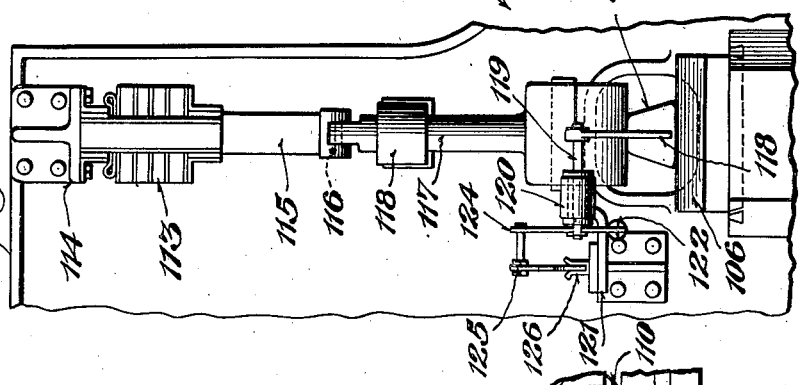
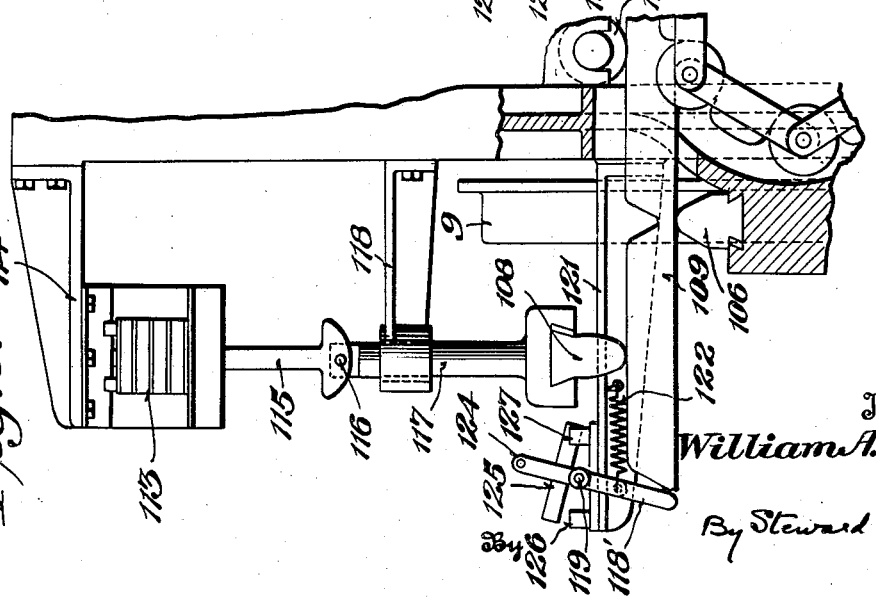
Inventor
William A. Miles,
By Steward & McKay
Attorneys Patented Sept. 1, 1931

1,821,270

UNITED STATES PATENT OFFICE

WILLIAM A. MILES, OF SALISBURY, CONNECTICUT

APPARATUS FOR MOLDING IN SAND

Application filed April 25, 1929. Serial No. 358,058.

This invention relates to the casting of a large number of units of the same configuration and size and while not restricted to such use is designed more particularly for making pig iron.

Apparatus for preparing the casting-floor for the casting of pig iron is shown in my earlier Patent No. 358,982 issued March 8, 1887. This apparatus was designed to form in the casting floor main-run gates, sow and pig molds.

One of the principal objects of the invention is to enable pig iron to be cast without forming sows hitherto considered indispensable.

A further object of the invention is to provide a method and apparatus for casting ingots of such form that they may be readily broken into pigs of standard length.

Another object of the invention is to provide means for lifting the ingots off the floor and breaking them up into pigs.

A still further object is to provide a single machine which will first form a series of parallel rows of molds for notched ingots and then pick up the ingots cast therein and break them into pigs at the notched points therein.

Other objects and advantages will hereinafter appear in connection with the drawings which show, in preferred form, one embodiment of the invention.

On the drawings:—

Figure 2 is a side view of the molding-machine.

Figure 7 is a detail view of the controlling mechanism for the ingot hoist.

Figure 8 is a detail view of the controlling mechanism for the electromagnets forming part of the ingot hoist.

Figure 9 is a detail side view of the solenoid operated hammer for breaking the ingots into pigs.

Figure 10 is an end view of the same.

Figure 11 is a detail view of a modified form of hammer designed for operation by compressed air or steam.

Figure 1:
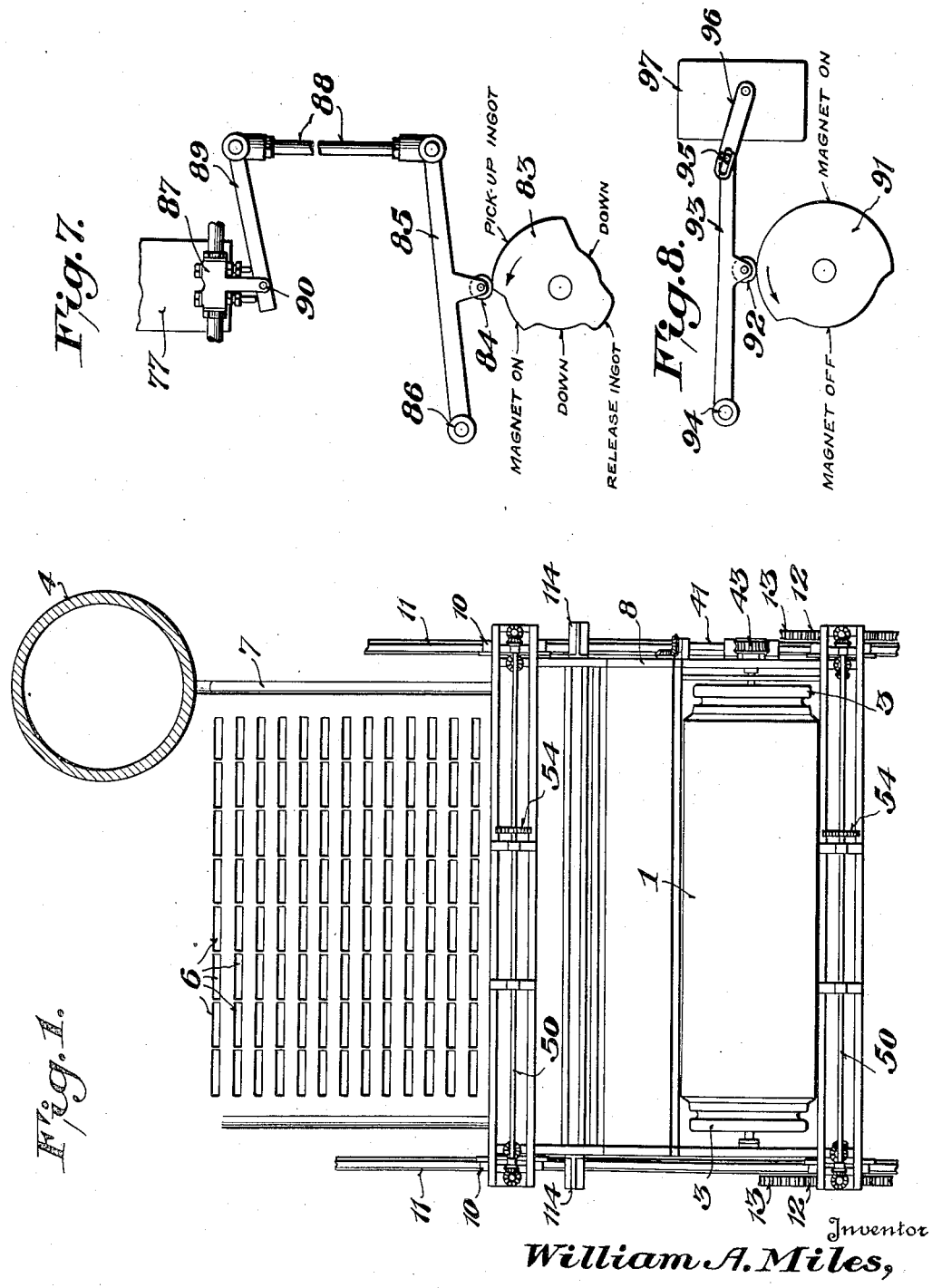
Figure 1 is a diagrammatic plan view representing a portion of the casting-floor and showing the molding-machine in position over such casting floor.

The mechanism for preparing a molding floor for the casting of pig iron in the specific embodiment here shown comprises a rotatable cylinder 1, whose exterior surface is provided with longitudinally extending ribs 2, which are adapted to form corresponding depressions 6 in the sand of the molding floor, thus forming long troughs in which units consisting of a plurality of pigs may be cast, such units being termed "ingots" herein. The main run 7, which carries the flow of molten iron from the tap hole of a blast furnace 4, is molded operatively adjacent the above-mentioned troughs by peripheral ring 3 at one end of cylinder 1.

To enable the metal to flow from the main run a hole may be made in the ridge of sand separating the main run from the ingot depressions opposite each of the latter. Conveniently this hole is made by hand after the main run and ingot depressions have been formed by the passage of the cylinder over the casting floor. Each of the ribs 2 is provided with a plurality of notches 5 which are spaced apart in such manner as to divide each ingot mold into any desired number of pig lengths, so that ingots cast in the troughs will be correspondingly notched, thus facilitating the breaking of the same into pig lengths by mechanism hereinafter to be described in detail.

The molding cylinder 1, is mounted on a suitable carriage comprising frame 8 provided with flanged wheels 9 and 10, which travel on rails 11. In order to insure synchronous movement of the carriage and the cylinder 1 the flanged wheels 9 have gears 12 rigidly connected therewith, which gears engage with racks 13 adjacent each rail 11.

The cylinder is rotated and the carriage traversed to and fro by power supplied by an electric motor 14, connected by a flexible coupling 15, a speed reduction mechanism 16 and clutch 17 to a pinion 18. The clutch is operated by lever 21 in the usual manner.

The pinion 18 is connected by a chain 19 to a gear 20. This gear 20 is mounted (Figures 5 and 6) on a shaft 22 on which are arranged integrally formed gears 23, 24 and 25. These three gears are mounted on a spline so that by means of lever 112 they may be moved to and fro along the shaft 22.

Figure 5:
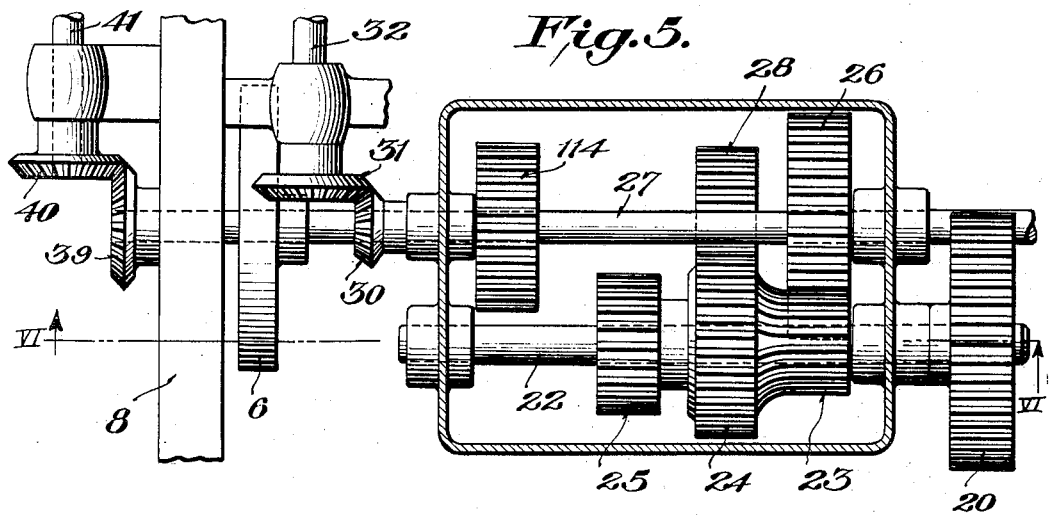
Figure 5 is a detail plan view of the gearing by which the molding cylinder and the carriage therefor are driven.
Figure 6:
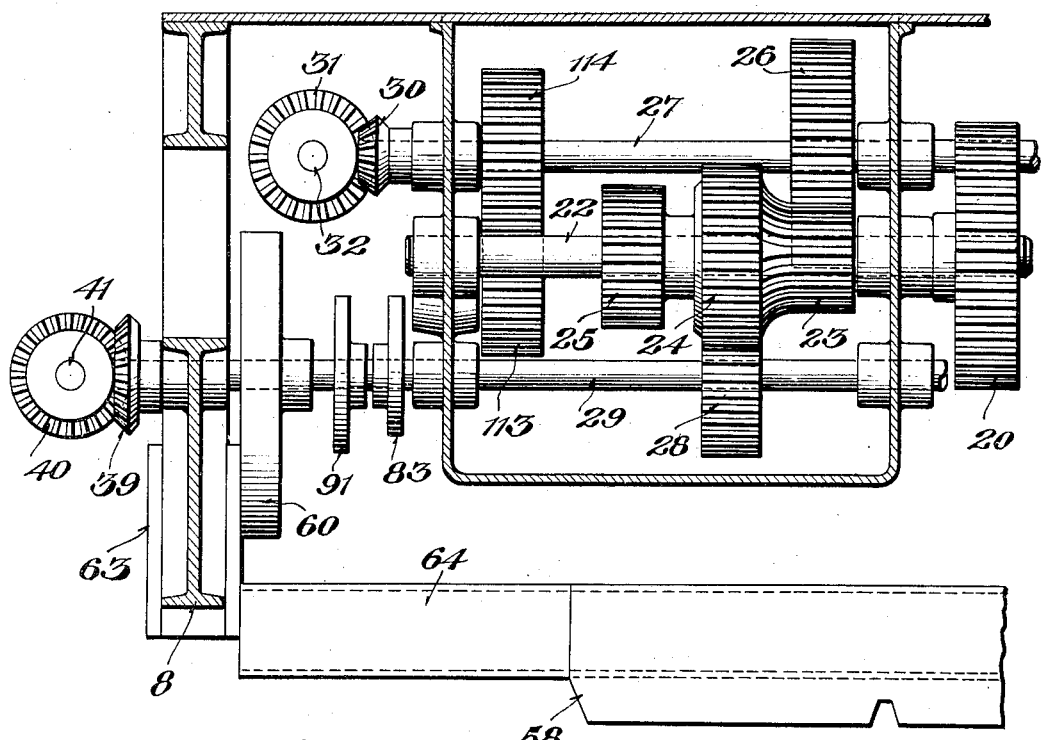
Figure 6 is a section on the line VI—VI of Figure 5.

When the carriage is to be moved over the casting floor to mold its surface, the gears 23, 24 and 25 are in the position shown in Figures 5 and 6. In that position the gear 23 meshes with gear 26 on shaft 27 and gear 24 meshes with gear 28 on shaft 29.

Figure 3:
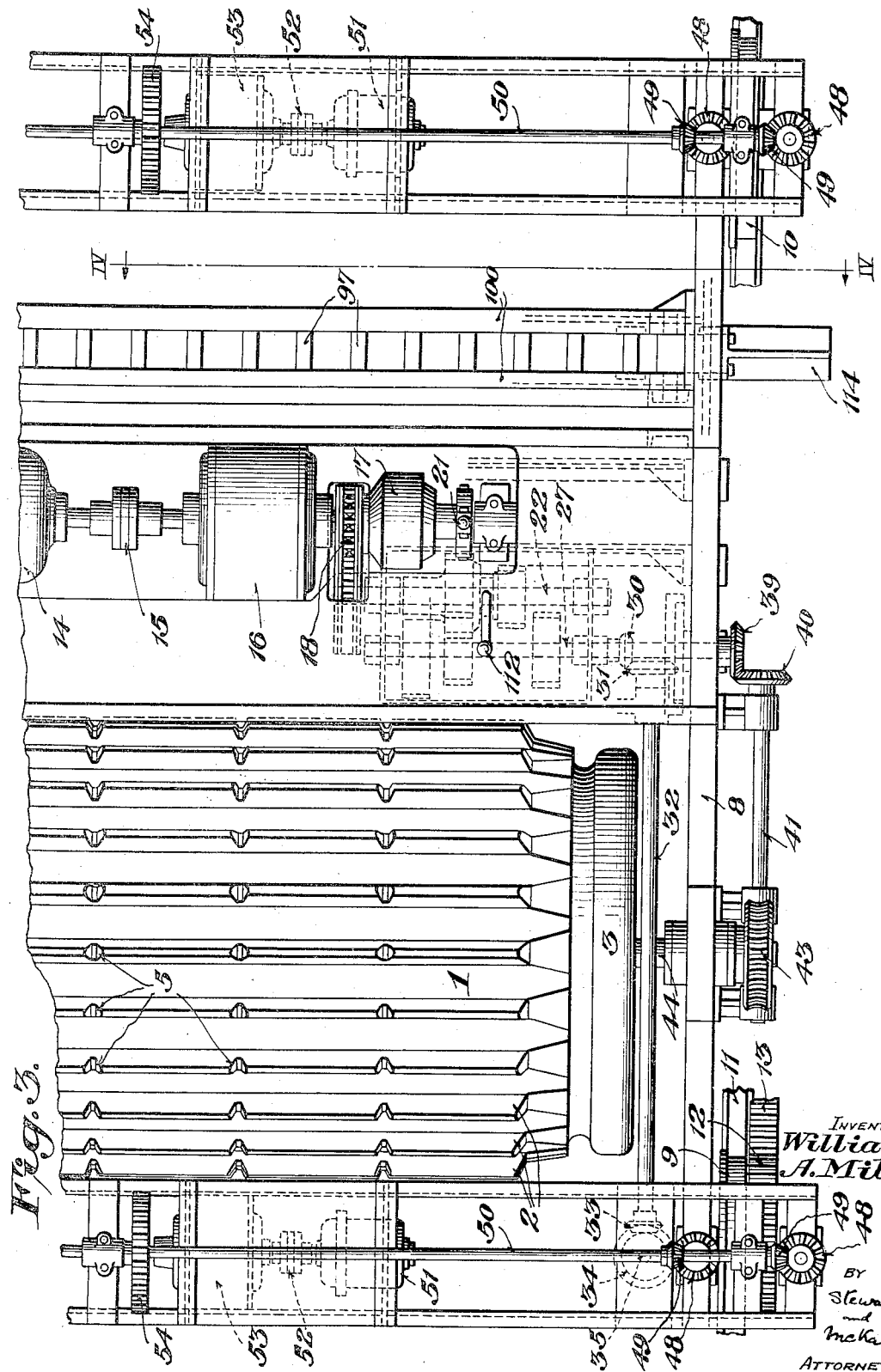
Figure 3 is a plan view of a part of the molding-machine.

Shaft 27 drives the carriage through bevel pinions 30, 31, shaft 32, bevel pinions 33, 34 (Figure 3), vertical shaft 35, bevel pinions 36, 37 and axle 38 on which are mounted the flanged wheels 9 and the gears 12.

Shaft 29 drives the cylinder 1 through bevel pinions 39, 40, shaft 41, worm 42 and gear 43 mounted on the axle 44 of the cylinder 1.

The mechanism just described provides for the slow travel of the carriage and slow synchronous rolling of the cylinder over the casting floor.

After the desired depressions 6 have been made in the casting floor the cylinder and its cooperating mechanism are lifted clear of the floor and the carriage run back away from the furnace.

For the return or reverse drive of the carriage the triple gear 23, 24 and 25 is moved to the left (Figure 6) by lever 112 to bring gear 25 into mesh with the reverse idler pinion 113, which in turn meshes with gear 114, the gear 25 being larger than gear 23 and gear 114 being smaller than gear 26 so that the rate of return movement of the carriage is considerably higher than the rate of forward movement.

To enable the frame 8 or the chassis of apparatus to be raised with respect to its flanged supporting wheels 9 and 10, the axles 38 of the latter are mounted in bearing blocks 45 slidable vertically between guides 46 on the frame 8.

The position of bearing blocks 45 relative to their guides 46 is adjusted by means of threaded shafts 47 engaging threaded holes in the upper parts of the bearing blocks so that by turning these shafts first in one direction and then in the other, the frame 8 may be first raised and then lowered.

Adjustable bearing blocks 45 are arranged in pairs at each end of each axle 38 and each set of four bearing blocks for each axle are raised and lowered simultaneously and uniformly. This is conveniently accomplished by providing each adjusting shaft 47 with a bevel pinion 48 in mesh with a bevel pinion 49 on a shaft 50 extending the entire width of the carriage.

The shafts 50 at each end of the carriage are driven independently of each other by separate motors 51 each connected to the shaft 50 by flexible couplings 52, speed reduction gearing 53 and a pinion 55 (Fig. 2) in mesh with gear 54 on the shaft 50.

Desirably, the motors 51 are equipped with limit switches (not shown) to eliminate the possibility of the carriage being raised or lowered too far.

The raising and lowering of the frame does not interfere in any way with the driving mechanism for the cylinder 1. It does, however, necessitate mounting the bevel pinion 34 on a spline on the shaft 35 so that the driving connection between the shaft 32 and the flanged wheels 9 is not disturbed by vertical movements of the frame.

The apparatus also includes means for preliminarily forming the ingot molds before they are finally formed by ribs 2 of cylinder 1. In molding pig iron in sand, the sand should be reasonably firm, yet not tightly packed for, if it be tightly packed, a "boil" is likely to result; a "boil" being in the nature of an explosion which scatters molten iron in every direction. Such preliminary preparation of the sand is accomplished by teeth 56, leveler 57 and scraper 58. The operation of teeth 56 is comparable to that of an agricultural harrow, as they thoroughly break up the sand of the molding floor. Leveler 27 is a unit strip of metal by which the molding floor is smoothed after being broken by teeth 56.

The harrow teeth 56 and the leveler 57 while adjustable vertically by screws 59, are ordinarily fixed in position. The scraper 58, however, has to move vertically so as to dig a series of troughs in the sand at points which will be later occupied by the ribs 2 of the cylinder 1. To secure this vertical movement synchronous with the rotation of the cylinder 1 the shaft 29, which drives the latter, is arranged to extend the full width of the carriage and at each end is provided with a cam 60. The outer face of each cam 60 is formed with a groove 61 in which runs a roller 62 attached to the inner side of a block 63, vertically slidable in suitable guides on the frame 8. These blocks 63 are connected together by a channel or other bar 64 to the front face of which is secured the scraper 58.

As shown in Figure 6 the scraper 58 is notched in a corresponding manner to the ribs 2 of the molding cylinder so that all the latter has to do is to complete and surface the depressions made by the scrapers.

Preferably the molding cylinder performs a dual function, first, completing the formation of the depressions in the casting floor so far as their configuration is concerned and second, providing the ingot molds with a facing of charcoal or other material capable of preventing sand from sticking to the ingots.

In place of charcoal, graphite, powdered coal and various other substances may be used. These materials while preferably sprinkled on the cylinder in the form of dry powder may in some instances be sprayed upon the molding cylinder in the form of a suspension.

The preferred means for providing the ingot molds with a facing of charcoal or other suitable facing material comprises a hopper 64 mounted over the molding cylinder 1. This hopper is provided with a partially foraminous bottom, the foraminous portion being normally covered by a closure member held in place by spring 65, and moved into open position by lever 66 connected to pawl 67, which pawl is arranged to be struck by the molding ribs 2 on cylinder 1. When a rib strikes the pawl the foraminous portion of the bottom of hopper 64 is uncovered and a quantity of powdered charcoal is deposited upon one of the preceding ribs. The hopper 64 extends the entire length of cylinder 1 and there may be a plurality of pawls 67 for operating the closure member.

Adhesion of the charcoal to the ribs 2 of cylinder 1 may be aided, if desired, by maintaining a coating of moisture on such ribs. Such coating of moisture may be induced by refrigerating coils (not shown) adjacent the inner surface of the molding cylinder. Cold brine, cold or compressed gas may be pumped into such refrigerating coils through shaft 44 which may be hollow for this purpose. The provision of such refrigerating coils causes a condensation on the cylinder of moisture. Optionally a coating of moisture may be produced on the molding cylinder by introducing steam under hood 68 through pipe 69. When ribs 2 press into the molding sand the coating of moist charcoal is transferred to the surface of the ingot mold in the sand, where it serves to prevent sand sticking to the ingots.

If the facing material is to be sprayed upon the molding cylinder in the form of a suspension the cylinder preferably is maintained at a temperature of 180°–200° F. for the purpose of eliminating some of the water of the suspension. This may be readily accomplished by introducing steam into the coils used for refrigerant, when a dry powder is applied.

The casting of long single notched ingots instead of sows with a series of pigs projecting therefrom at right angles greatly aids the breaking up of the cast metal by enabling the breaking operation to be carried out automatically.

The apparatus is provided with ingot lifting, conveying and breaking means, the former being synchronized with the movement of the carriage over the casting floor, so that as the carriage passes over the latter each ingot is picked up, placed on a conveyor running transversely of the carriage and broken into pigs as it is discharged laterally from the carriage. The operation of the machine in this respect is very similar to a harvesting machine.

Figure 4:
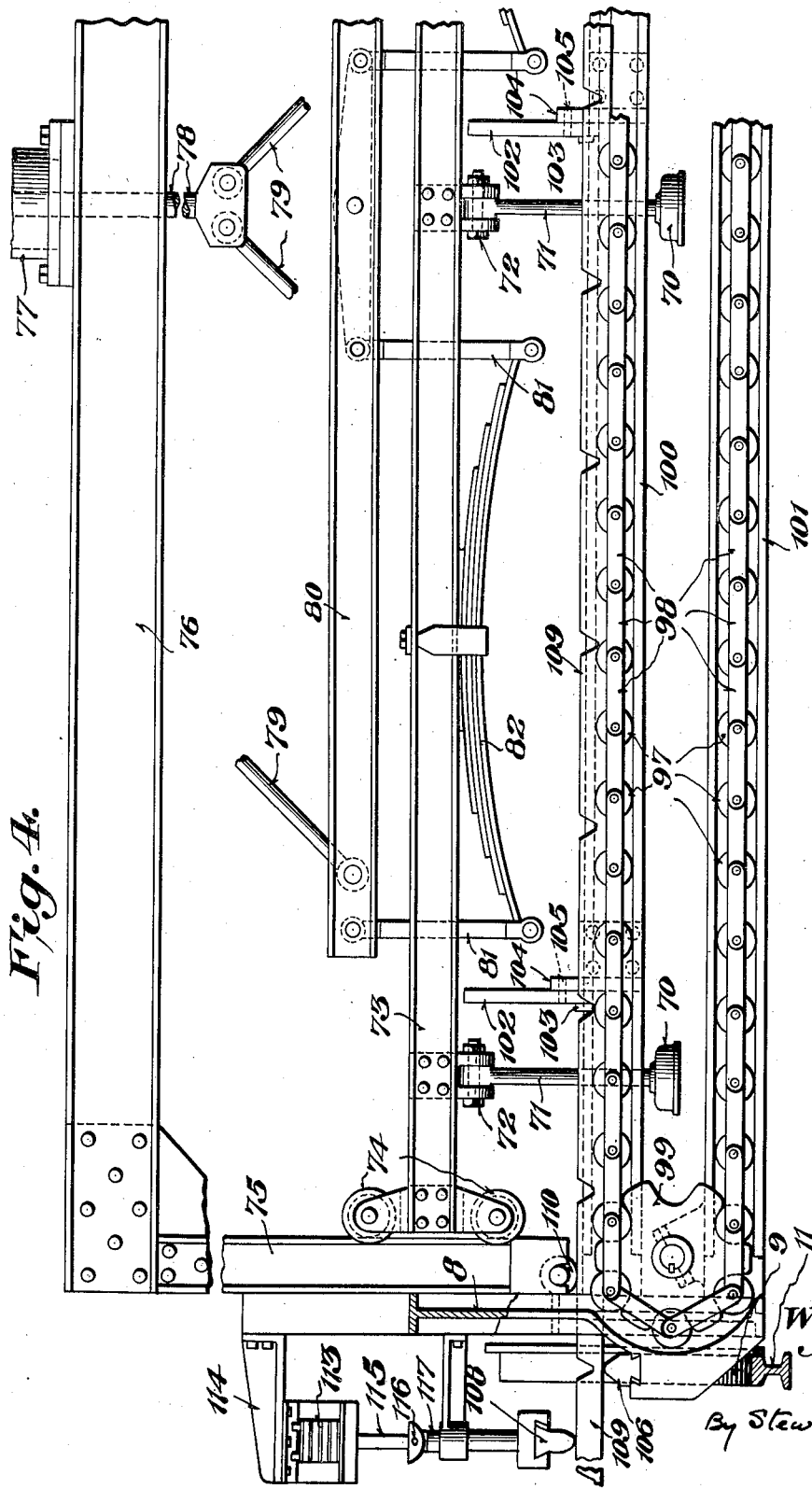
Figure 4 is a view taken on the line IV—IV, with parts cut away to show more clearly the ingot lifting, conveying and breaking mechanism.

The pigs are lifted from the casting floor by means of a series of electromagnets 70 supported (see Figure 4) by links 71 pivotally attached at 72 to a frame 73. At each end of this frame are pairs of rollers 74 which run upon vertical columns 75 secured to the main frame 8 of the carriage. The tops of these columns are connected by a beam 76 which not only serves to keep the columns in alignment but also to support the hoist for the frame 73 carrying the electromagnets.

As shown the hoist may be operated by compressed air in which case it comprises a cylinder 77, a piston and a downwardly extending piston rod 78. From the piston rod is suspended by rods 79 a beam 80 connected to the frame 73 by springs 82 and shackles 81. These springs not only allow the electromagnets to seat on ingot surfaces of different height but also allow the ingots to be deposited on the conveyor without any shock or at least insufficient shock to cause a premature fracture of the ingot.

The air hoist and its electromagnets are arranged to synchronize in operation with the movement of the carriage across the casting floor. As the electromagnets approach one of the ingots they are lowered into contact therewith, then they are energized to grip the ingot, lifted, then lowered and finally de-energized to deposit the ingot on the conveyor. This cycle of operations must be completed within the time taken by the carriage to move from one ingot to the next so as to allow each and every ingot to be lifted from the casting floor and deposited upon the conveyor. Further, the conveyor and ingot breaking mechanism must be so timed that one ingot is broken into pigs and discharged before the next ingot is deposited on the conveyor.

The conveyor comprises a series of flanged rollers 97 connected at their ends by links 98 forming an endless chain passing at each end around sprockets 99. One of these sprockets is driven from a suitable source of power conveniently by a train of gears and clutch (not shown) from the shaft 29 which drives the cylinder 1 and which, as hereinafter described, also controls the operation of the air-hoist and the electromagnets.

The horizontal flights of the conveyor are supported and guided by inwardly extending flanges on cross beams 100 and 101 which engage the flanged ends of the rollers 97.

The vertical plane in which the hoist and electromagnets move is on one side of the central plane of the conveyor so that after each ingot has been lifted it must be moved laterally to deposit it on the conveyor.

For this purpose a series of arms 102 are pivotally attached at 103 to brackets 104 secured to one of the beams 100. The range of pivotal movement is limited by pins 105 on the brackets 104 which extend through slots in the arms 102 (Figure 2).

In the position shown in the drawings these arms extend across the vertical plane of movement of the hoist and electromagnets. When an ingot is lifted by the latter, the ingot striking against the underside of the arms 102 pushes them aside until the ingot has been lifted high enough to allow the arms to swing back underneath the ingot. When the ingot is lowered it contacts with the upper face of the arm 102 and is guided thereby towards the conveyor.

When the ingot is lifted off the casting floor the notches are on the underside but as the ingot slides down the arms 102, after being released by the electromagnets it rolls over so that it rests on the conveyor in inverted position, as shown in Figure 2.

The conveyor then moves the ingot over an anvil 106 at one side of the main carriage frame. The notches in the ingot being now on top do not interfere with the smooth easy movement of the ingot over the anvil.

Automatic operation of the air hoist is obtained by means of a cam 83 on the shaft 29 (Figure 6) which drives the cylinder 1. A roller 84 on an arm 85 pivoted at 86 to the main carriage frame runs on the periphery of this cam. The free end of this arm 85 is connected to a double air valve 87 by a link 88 and an arm 89 pivotally connected to the air valve at 90. The air valve itself is of standard type so that its construction is not shown in detail.

On the same shaft 29 that carries the air-hoist cam is a second cam 91 for controlling the energization of the electromagnets. On the periphery of this cam runs a roller 92 on an arm 93 pivotally mounted on the main carriage frame at 94, the other end of this arm carries a pin 95 extending through a slot in the end of the handle 96 of the electromagnetic switch box 97.

In the position of the cams 83 and 91 shown in Figures 7 and 8 the electromagnets have been energized to grip the ingot therebeneath and the air inlet valve of the hoist has just been opened to start lifting the ingot. The cam 83 holds the air inlet valve open long enough to allow the hoist to raise the ingot above the upper ends of the arms 102, next the air inlet valve is closed and the air-exhaust valve opened to allow the hoist and ingot to move downwardly, the ingot contacting the upper side of the arms 102 and sliding down them towards the conveyor. Shortly afterwards the cam 91 throws the switch for the electromagnets thereby de-energizing the latter and depositing the ingot on the conveyor.

The cam 83 at about this time closes the air-exhaust valve without opening the air inlet valve thereby checking downward movement of the hoist and electromagnets. This allows the latter to swing back clear of the conveyor before continuing their downward movement to pick up the next ingot. After a short interval the air exhaust valve is again opened to drop the electromagnets to substantially the level of the ingots then the cam 83 closes the air exhaust valve to hold the hoist and electromagnets in their lowermost position. Next the cam 91 closes the circuit through the electromagnets, thereby causing the latter to seize the ingot beneath them and the cycle of operations is repeated.

In the form of construction illustrated by way of example the conveyor passes the ingot 109 to the apparatus by which it is to be broken into pigs, the length of which is determined by the distance between the notches in the ingots. The method of breaking preferably employed consists in passing the ingot 109 beneath a roller 110 then over an anvil or fulcrum 106 and finally striking the projecting end of the ingot to snap it off at the point where it is notched.

Two forms of hammer are shown, one that shown in Figures 9 and 10 being operated electrically, the other, that shown in Figure 11, being operated pneumatically by air or steam. In both cases the operation of the hammer is controlled by movement of the ingot so that the hammer strikes the projecting end of the ingot at substantially the instant the adjacent notch therein is over the anvil 106.

The electrically operated hammer comprises a push-pull solenoid 113 mounted on a bracket 114. Various forms of solenoid may be used for this purpose, a suitable one being that illustrated on page 914 of General Electric Company catalogue No. G. E. A. 600. The draw and thrust bar 115 of this solenoid is connected by a pin 116 to a bar 117, to the lower end of which is secured the hammer-head 108. A bracket 118 is provided for carrying a suitable guide for the bar 117.

The solenoid is operated by means of a trip lever 118 attached to the end of a shaft 119 journaled in a bearing 120 carried by a bracket 121. This trip lever is arranged in the path of movement of the ingot and is yieldingly drawn towards the latter by means of a spring 122, connected at one end to the bracket 121 and at the other to the lower end of an arm 123 secured to the shaft 119. The latter shaft also carries an upwardly extending arm 124 to which is attached a double knife-blade switch 125 adapted to contact alternately with spring contacts 126, 127. When the end of the ingot forces the trip lever to the left (Fig. 9) against the action of the spring 122, circuit is closed through the push circuit of the solenoid and the hammer descends to break off the projecting end of the ingot. As soon as the latter falls the spring pulls the trip lever to the right opening the circuit through contacts 127 and closing the circuit through contacts 126 and thereby causing the solenoid to lift the hammer head 108.

In the pneumatically operated form of construction the hammer head 108 is mounted on the end of a piston rod operated by a piston within a cylinder 129. Compressed air is admitted into each end of the cylinder alternatively from a pipe 130 by a valve 131. This valve is operated by means of a trip lever 133 on a shaft 134 journaled in bearings on a bracket 135. The shaft 134 also carries a bell-crank 136, one arm of which carries a counterweight, while the other end is connected by a link 137 to the arm 132 which operates the valve 131. In this form of construction the counterweight serves to hold the trip lever in the position shown in dotted lines until pushed over into the full line position by the end of the ingot. When the parts are in the full line position compressed air is admitted into the bottom of the cylinder 129 and when in dotted line position is admitted into the top of the cylinder. The valve opens the exhaust ports at the same time that air is admitted to the opposite ends of the cylinder.

With the hoist and electromagnets operating in synchronism with the movement of the carriage over the casting floor and the hammer being tripped by the movement of the ingot, the lifting, conveying and breaking mechanisms operate as a unit producing pigs of the desired standard length without the intervention of manual labor or even manual control other than that required to start and stop the motor which drives the carriage and the mechanism carried thereby.

While only a single pair of tracks are shown several pairs may be used together with a track running transversely at the ends of such pairs of tracks for a transfer table in the manner shown in my earlier Patent 358,982.

Numerous other additions, changes and alterations may be made in the apparatus shown in the drawings without departing from the spirit of the invention.

What is claimed is:

1. An apparatus of the type set forth comprising a carriage adapted to tranverse the casting floor, means on said carriage for forming unconnected molds arranged transversely with respect to the direction of movement of the carriage, a conveyor on said carriage arranged parallel to said molds, means for lifting castings from said molds to said conveyor and means for driving said carriage, and operating said lifting means synchronously.

2. An apparatus of the type set forth comprising a carriage adapted to traverse the casting floor, a conveyor on the carriage extending transversely thereacross, casting lifting means on one side of the conveyor, arms normally projecting upwardly across the movement of said lifting means adapted to guide the castings to said conveyor, said arms being movable laterally to allow upward movement of the castings.

3. An apparatus for making pig iron comprising a mold having a rounded V-shaped trough in its upper surface, said trough being divided into sections by transverse ridges of lower height than the walls of the trough, means for transferring a bar of metal cast in said trough onto a conveyor and depositing it thereon in inverted position, an anvil in line with the end of the conveyor over which anvil the bar of metal is passed by said conveyor, a hammer on the discharge side of said anvil and means for operating said hammer, the movement of the conveyor and the operation of the hammer being synchronized so that the hammer strikes the projecting end of the bar at substantially the time the adjacent notch in the bar is over the anvil whereby the bar is broken into sections corresponding to the sections of the mold.

4. An apparatus of the type set forth including a carriage adapted to traverse the casting floor, means on said carriage for forming a series of parallel unconnected segmental molds arranged transversely with respect to the direction of movement of the carriage, means on said carriage for lifting ingots from the casting floor, a conveyor on the carriage arranged parallel to the said molds, means for transferring the ingots from said lifting means to the conveyor and simultaneously inverting them.

5. An apparatus as in claim 4 also including means on said carriage for breaking the ingots into sections.

6. An apparatus of the type set forth including a carriage adapted to traverse a uniformly spaced series of castings on a casting floor, casting lifting means adapted to reciprocate vertically and means for driving said carriage over said castings and reciprocating said casting lifting means synchronously.

7. An apparatus of the type set forth including a conveyor, means for depositing an ingot thereon, an anvil at one end of the conveyor and in alinement therewith and a hammer adapted to strike a blow on the part of the ingot projecting beyond said anvil to break said ingot into sections and means for operating said hammer by movement of said ingot.

8. An apparatus of the type set forth including a carriage, tracks therefor on a casting floor, means for driving said carriage, means on said carriage for forming a series of uniformly spaced molds between said tracks as the carriage moves over said casting floor, and means on said carriage for lifting castings out of said molds as the carriage moves over the casting floor a second time, said carriage driving means also operating the lifting means whereby passage of the carriage over the said castings synchronizes with the operation of said lifting means.

9. An apparatus as in claim 8 also including a rack parallel to one of the tracks and a gear operatively connected to the driving means for the carriage in mesh with said rack thereby maintaining synchronism between the passage of the carriage over said castings and the operation of said lifting means.

10. An apparatus of the type set forth including a carriage, tracks therefor on a casting floor, a molding cylinder on said carriage having a substantially cylindrical surface substantially unbroken except by a plurality of parallel longitudinal notched ribs and a neck and circular head for forming the main run through which the casting metal is to flow into the depressions formed in the molding sand by said ribs, and vertically reciprocating means on said carriage for forming preliminary depressions in the molding sand adapted to register with said ribs as said cylinder rolls over the casting floor.

11. A molding cylinder having a substantially cylindrical surface substantially unbroken except by a plurality of parallel longitudinal notched ribs and a neck and circular head for forming the main run through which the casting metal is to flow into the depressions formed in the molding sand by said ribs, a container for mold surfacing material arranged longitudinally above said cylinder and having apertures for discharging material therefrom onto the cylinder, closure means for said apertures and means for operating said closure means periodically in synchronism with the rotation of the cylinder whereby discharge of said material is substantially restricted to said ribs.

12. An apparatus of the type set forth including a carriage, tracks therefor on a casting floor, a molding cylinder on said carriage having mold forming projections thereon, means for rotating said cylinder and traversing said carriage and means for applying mold surfacing material to said projections selectively with respect to the remainder of the surface of the cylinder.

13. An apparatus of the type set forth comprising a carriage adapted to traverse the casting floor, means on said carriage for forming unconnected molds arranged transversely with respect to the direction of movement of the carriage, a conveyor on said carriage arranged parallel to said molds and means for lifting castings from said molds to said conveyor.

In testimony whereof I hereunto affix my signature.

WILLIAM A. MILES.